United States Patent [19]

Jeong

[11] Patent Number: 5,384,849
[45] Date of Patent: Jan. 24, 1995

[54] APPARATUS AND METHOD FOR ENCODING/DECODING DATA INCLUDING THE SUPPRESSION OF BLOCKING ARTIFACTS

[75] Inventor: Je-chang Jeong, Seoul, Rep. of Korea
[73] Assignee: Samsung Electronics Co., Ltd., Kyunggi-Do, Rep. of Korea
[21] Appl. No.: 62,599
[22] Filed: May 18, 1993
[30] Foreign Application Priority Data May 18, 1992 [KR] Rep. of Korea .................. 92-8362

[51] Int. Cl.⁶ ..................... H04N 1/415; H03M 7/30
[52] U.S. Cl. ............................ 380/49; 348/404; 348/420; 358/433; 371/371; 382/56
[58] Field of Search ............ 358/433; 371/37.1, 37.7, 371/71; 382/56; 380/49; 348/404, 420

[56] References Cited

U.S. PATENT DOCUMENTS 4,754,492 6/1988 Malvar ............................ 382/56 X
5,121,216 6/1992 Chen et al. ....................... 358/433 X

*Primary Examiner*—Gilberto Barron, Jr.
*Attorney, Agent, or Firm*—Sughrue, Mion, Zinn, Macpeak & Seas

[57] ABSTRACT

A method and apparatus for removing blocking artifacts in an encoder/decoder system. The encoder includes a delay device for delaying original input frame data, a decoder for decoding the compressed data and outputting the restored frame data, and a blocking artifact measurer which receives the restored frame data and the original frame data, and measures the degree of blocking artifact using the above two frame data so as to generate a predetermined post-processing parameter. The post-processing parameter is transmitted to the receiver/decoder together with the encoded data. The decoder includes a receiver for receiving the encoded data and the post-processing parameter, a second decoder for decoding and restoring the encoded transmission data, and a filter for adaptively filtering the restored data output from the second decoder according to the post-processing parameter. As a result, the blocking artifact of the block boundary is removed from the encoded data such that a user does not notice any reduction in the picture quality.

22 Claims, 4 Drawing Sheets

APPARATUS AND METHOD FOR ENCODING/DECODING DATA INCLUDING THE SUPPRESSION OF BLOCKING ARTIFACTS

BACKGROUND OF THE INVENTION

The present invention relates to a system for encoding and decoding digital video data which is divided into blocks of predetermined size. More particularly, the present invention relates to an encoding and decoding method and apparatus for reducing blocking artifact, which is a phenomenon of degrading the quality of a picture that is reproduced by dividing each frame of video data into a plurality of blocks and encoding the divided blocks.

Conventional systems for transmitting and receiving video and audio signals often employ an encoding and decoding system. Such encoding and decoding system encodes the video and audio signal into digital data, stores the data, and then transmits the digital data to a receiver. At the receiver, the encoded data is then decoded so as to be reproduced into the original signal (i.e., the signal prior to be encoded). Typically, the encoding of the data includes some form of data compression so that less data needs to be stored and transmitted.

FIG. 1A illustrates a conventional encoding system. Video data of each frame is divided into blocks of size $N \times N$ (which is generally represented as $N_1 \times N_2$, but for the convenience of explanation, is assumed as $N_1 = N_2 = N$ which represents a pixel unit). Each block of data is input to an orthogonal transformer 1. The orthogonal transformer 1 performs data-transformation, such as DCT (discrete cosine transform) with respect to each block data, and converts the block data into transformation coefficients of the frequency domain. The output of the orthogonal transformer 1 is then applied to a quantizer 3, which changes the conversion coefficients into representative values, each of which has a predetermined level, after taking the energy distribution of the transformation coefficients into consideration. A variable length encoder 5 further compresses the data by variable-length-encoding the representative values using statistical characteristics of the representative values.

The encoded, compressed data is then transmitted to the decoding system shown in FIG. 1B. The received data passes through restorage means having a variable length decoder 11, an inverse quantizer 12, and an inverse orthogonal transformer 13, which decode and uncompress the data to produce data close to the state before being encoded.

FIGS. 2A and 2B illustrate another example of a conventional encoding and decoding system, respectively. Generally, there are many similar portions (i.e., frames or blocks) of a picture. In this situation, the data can be further compressed by generating a motion vector, which is calculated by estimating the amount of motion between adjacent frames of a picture, and through differential-pulse-code-modulation (DPCM). In the decoding process, the motion vector which is calculated in the encoding procedure is used to compensate or reconstruct the block of data, thereby reproducing the original data.

An encoding and decoding system which utilizes the motion-compensated DPCM method includes a predetermined feedback loop for the motion compensation. As shown in FIG. 2A, the feedback loop for the motion compensation in the encoding system, includes an inverse quantizer 4, inverse orthogonal transformer 2, adder A2, frame memory 6, motion estimator 7, and motion compensator 8. The decoding system, as shown in FIG. 2B, similarly includes a feedback loop having a frame memory 14, motion compensator 15, and adder A3. Since such a DPCM process of the encoding and decoding system is known, the detailed description will be omitted.

Switches SW1 and SW2, which are provided in the respective apparatus of FIGS. 2A and 2B, refresh the video data on a frame or block unit basis to prevent accumulation of errors in the DPCM process. That is, when the switches SW1 and SW2 are turned on, the DPCM process is performed, while when the switches are turned off, the PCM data is encoded for transmission.

In such a conventional encoding and decoding system, since a single picture is divided into blocks of $N \times N$ size, and then the blocks are processed in order to encode and compress the video data, if the decoding system receives and reproduces the transmitted signal which has been encoded and compressed, the boundaries between blocks of the picture are easily exposed and, consequently, a blocking artifact of a certain portion appears as a lattice results. In other words, the boundaries of blocks are not capable of being easily identified which results in blocking artifacts occurring.

Recently, there have been several methods proposed to reduce such a blocking artifact. For example, in a first method, the divided blocks of the picture are overlapped with each other. A second method utilizes an overlapped orthogonal transform. In a third method, the boundaries of the blocks are passed through a low-pass filter(s) in the decoder. However, since the first and second methods change the basic composition of the encoding system, they are quite complex and require an extensive amount of additional hardware. The third method also has a problem in that the resolution of the boundary portion of the block is lowered.

SUMMARY OF THE INVENTION

Therefore, to solve the above problems and disadvantages, it is an object of the present invention to provide an encoding system for suppressing blocking artifacts without lowering resolution of the boundary of blocks in which each frame is divided into blocks and the boundary portion of each block is filtered by a low-pass filter having a transfer function which is adaptively varied.

It is another object of the present invention to provide a decoding system for decoding the video data which is encoded by the encoding system which suppresses the above-mentioned blocking artifacts.

The above and other objects and advantages are accomplished by the present invention which provides a method for suppressing blocking artifacts in an encoder including the steps of dividing original frame data into a size of predetermined blocks, compressing the data through a data transformation and a quantization process on a per unit block basis, decompressing and restoring the compressed data on a per unit frame basis, delaying the original frame data for a predetermined period of time, measuring a degree of blocking artifact by comparing the restored frame data with the delayed original frame data, and generating a post-processing parameter which represents the degree of blocking artifact.

Further in accordance with the above objects and advantages, the present invention provides a method for suppressing blocking artifacts in a decoder which receives an encoded transmission signal including encoded data and a post-processing parameter from an encoder. The post-processing parameter representing the degree of blocking artifact of the encoded data. The method includes the steps of receiving the encoded data and the post-processing parameter, decoding and restoring the received data, and adaptively filtering the decoded and restored data according to the post-process parameter.

Still, further, the present invention provides an encoding apparatus including an input terminal for receiving original frame data, dividing means, coupled to the input terminal, for dividing the original frame data into blocks of a predetermined size, processing means, responsive to the blocks of data, including means for compressing the data through a data transformation process and for quantizing the data through a quantization process on a per block unit basis, delaying means, coupled to the input terminal, for delaying the original frame data, restoring means, coupled to the processing means, for restoring the compressed and quantized data and outputting the restored frame data, and a blocking artifact measurer, coupled to an output of the delaying means for receiving the delayed original frame data and to an output of the restoring means for receiving the restored frame data, for measuring a degree of blocking artifact based on the delayed and restored frame data so as to generate a predetermined post-processing parameter.

Even further, the present invention provides a decoding apparatus for suppressing blocking artifacts which receives an encoded transmission signal including encoded data and a post-processing signal from an encoder. The post-processing parameter representing the degree of blocking artifact of the encoded data. The decoding apparatus includes means for receiving the encoded data and the post-processing parameter, restoring means for decoding and restoring the received encoded data, and means for adaptively filtering the restored data output from the restoring means according to the post-processing parameter.

DETAILED DESCRIPTION OF THE PREFERRED EMBODIMENTS

Preferred embodiments of the present invention are described below in more detail with reference to the accompanying drawings.

Figure 3A:
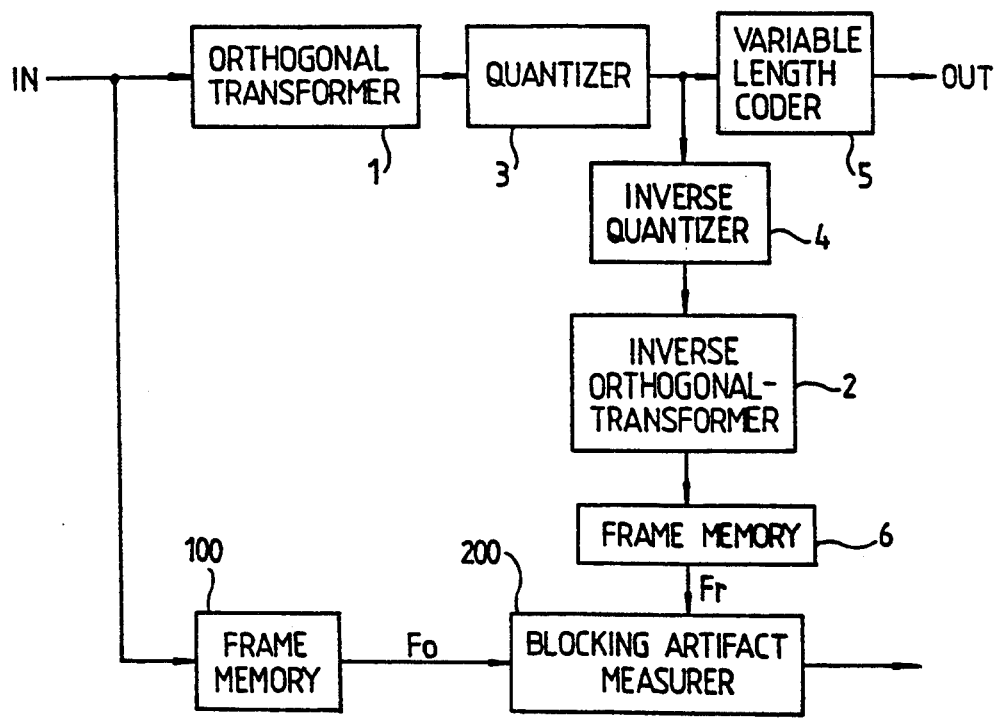
FIG. 3A is a block diagram of an encoder according to a first embodiment of the present invention.
Figure 3B:
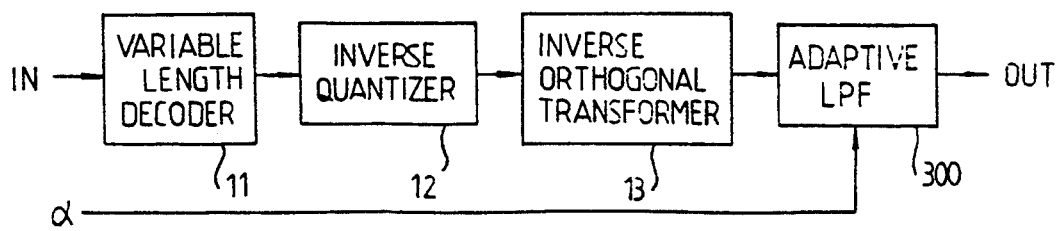
FIG. 3B is a block diagram of a decoder according to a first embodiment of the present invention.

FIGS. 3A and 3B show an encoder and a decoder according to a first embodiment of the present invention. As shown in FIG. 3A, the encoder includes an orthogonal transformer 1 for converting the N×N block data of the picture into transformation coefficients of the frequency domain, and a quantizer 3 and a variable-length-encoder 5 for quantizing and variable-length-encoding the transformation coefficients output from the orthogonal transformer 1 and for compressing the data. An inverse quantizer 4 receives the quantized data, and together with an inverse orthogonal transformer 2 and first frame memory 6, restores the quantized data into the video data of the spatial domain and reconstructs the frame data. A second frame memory 100 receives the original video data, and serves to delay the video data for a predetermined period of time prior to the data being discrete cosine transformed in the orthogonal transformer 1. A blocking artifact measurer 200 receives the delayed original frame data Fo from the second frame memory 100, and generates a post-processing parameter α which is varied according to the degree of discontinuity of the block boundary portion.

In FIG. 3A, operations and functions of the orthogonal transformer 1, quantizer 3, variable-length-encoder 5, inverse quantizer 4, and inverse orthogonal transformer 2 are known to a person skilled in the art. Accordingly, a detailed descriptions will be omitted.

The first frame memory 6 receives the restored block data output from the N×N inverse orthogonal transformer 2, and sequentially stores the block data to generate the restored frame data Fr. The second frame memory 100 receives the block data which is applied to the input terminal IN and stores it on a frame unit basis. The second frame memory 100 delays and outputs the stored frame data Fo after a predetermined period of time so that the output frame of data corresponds to frame of data Fr that is reconstructed and output by the first frame memory 6. The blocking artifact measurer 200 compares the restored frame data Fr supplied from the first frame memory 6 with the delayed original frame data Fo supplied from second frame memory 100, and measures the degree of blocking artifact at the block boundary portion. Based on the measured degree of blocking artifact, the measurer 200 varies and generates the post-processing parameter α according to the measured degree of blocking artifact. The generated post-processing parameter α is transmitted to a decoder along with the encoded video data.

The above blocking artifact measurer will be described in further detail with reference to FIG. 5.

Figure 5:
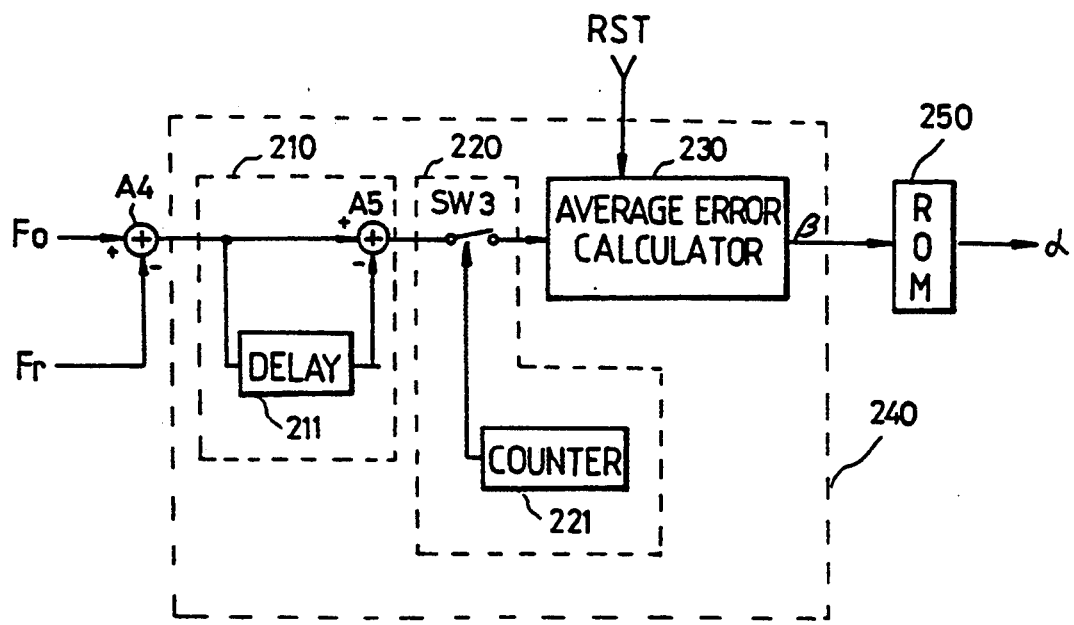
FIG. 5 is a detailed block diagram of a blocking artifact measurer of FIGS. 3A and 4A.
Figure 6:
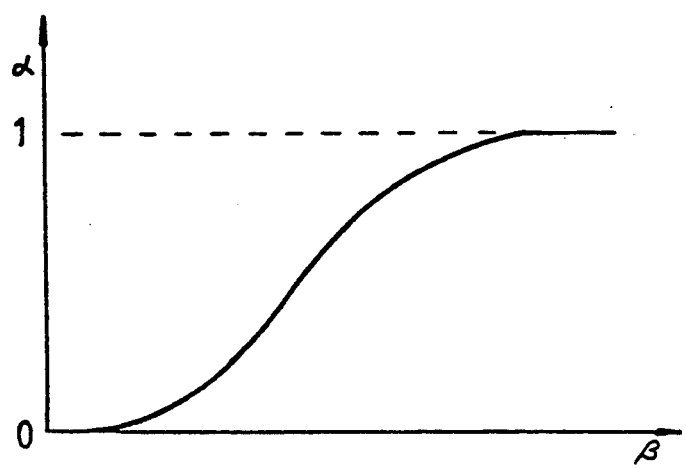
FIG. 6 is a graph which represents an operational characteristic of the blocking artifact measurer of FIG. 5.

FIG. 5 shows a detailed block diagram of the blocking artifact measurer 200, which includes a fourth adder A4 which receives the delayed original frame data Fo and the restored frame data Fr, and generates a frame data error corresponding to the difference between the frame data Fo and Fr, a discontinuity degree calculator 240 which receives the frame data error output from the fourth adder A4 and calculates a discontinuity degree parameter β due to the blocking artifact at the block boundary portion, and a read-only-memory (ROM) 250 which receives the calculated discontinuity degree parameter β and generates the post-processing parameter α which is varied in proportion to the magnitude of the discontinuity degree parameter β. The ROM 250 stores a predetermined look-up table which provides a correlation between the discontinuity degree parameter β and the post-processing parameter a. The characteristic of the look-up table has a non-linear proportional relationship as shown in FIG. 6.

The discontinuity calculator 240 includes an error value calculator 210 which receives the frame data error from the fourth adder A4 and calculates the error value between the respective pixels based on the frame data error, a block boundary detector 220 for detecting the error value corresponding to the boundary portion between respective blocks among the error values calculated in the error value calculator 210, and an average error calculator 230 which receives the error values generated by the block boundary detector 220 and generates the average error value corresponding to the discontinuity degree parameter β at each block boundary with respect to the entire error frame.

The blocking artifact measurer 200 operates as follows.

The fourth adder A4 calculates the frame data error using the delayed original frame data Fo and the restored frame data Fr. The frame data error output from the fourth adder A4 is applied to one input of a fifth adder A5. The frame data error is also input to a delayer 211, which delays the frame data error by a predetermined period of time and then outputs the delayed signal to the other input of the fifth adder A5. The fifth adder A5 calculates a difference between both input data. The output of the fifth adder A5 corresponds to the error value between the respective pixels of the error frame.

The output of the fifth adder A5 is then supplied to the average error calculator 230 via a switch SW3. The switch SW3 is turned ON or OFF by a control signal supplied from a counter 221. The control signal from the counter 221 turns the switch SW3 ON only when the error value output from the fifth adder A5 corresponding to each block boundary portion. Thus, only the error value between the respective pixels of each block boundary portion at the error frame is supplied to the average error calculator 230.

Next, the average error calculator 230 calculates an absolute value mean or a root mean square with respect to the error value applied via the switch SW3, and calculates an average error value with respect to each frame data error. The calculated average error corresponds to the discontinuity degree parameter β of each block boundary of each corresponding frame. Then, the average error calculator 230 is reset to a predetermined initial value (generally "0") by a reset signal RST. Here, the reset signal RST is applied on a per frame unit basis. However, the reset signal RST can be applied on a per unit basis where the unit is equal to a field or a predetermined size depending upon the system. The discontinuity degree parameter β output from the average error calculator 230 is supplied to the ROM 250. Then, the ROM 250 outputs the post-processing parameter α from the look-up table that corresponds to the discontinuity degree parameter β. The post-processing parameter α has a variable real value between "0" and "1" according to the variation of the discontinuity degree parameter β, as shown in FIG. 6.

Reference is now made to FIG. 3B, which illustrates the decoder according to a first embodiment of the present invention. The decoder receives the encoded transmission data from the encoder of FIG. 3A, and restores the received data to its original state. The decoder includes a variable-length-decoder 11 for variable-length-decoding the received data and converting it into quantized data, an inverse quantizer 12 and inverse orthogonal transformer 13 for inversely quantizing the quantized data, and then converting the inversely quantized data into video data of the spatial domain, and an adaptive low-pass filter 300 for suppressing the blocking artifact. The adaptive low-pass filter has filtering characteristics which are varied according to the post-processing parameter α that is received with the transmitted data from the encoder.

In the decoder as described above, the components except for the adaptive low-pass filter 300 are known to a person skilled in the art. Accordingly, their detailed descriptions will be omitted.

The adaptive low-pass filter 300 filters the restored video data output from inverse orthogonal transformer 13. The filtering characteristic is adaptively varied in accordance with the post-processing parameter α which is transmitted from the encoder. The filtering characteristic H of the adaptive low-pass filter 300 is as follows in which the filtering band is varied according to the post-processing parameter a:

$$H = a \degree L + (1 - a) \degree A \quad (1)$$

$$L = \begin{matrix} 1 & 2 & 1 \\ 2 & 4 & 2 \\ 1 & 2 & 1 \end{matrix} \quad (2)$$

$$A = \begin{matrix} 0 & 0 & 0 \\ 0 & 1 & 0 \\ 0 & 0 & 0 \end{matrix} \quad (3)$$

Here, L is a low-pass filter coefficient, and A is an all-pass filter coefficient. The equations (2) and (3) represent both the coefficients, respectively.

When the post-processing parameter α output from the blocking artifact measurer 200 is "0" there is no blocking artifact of the block boundary portion corresponding to the frame of the video data output from the inverse orthogonal transformer 13. In this case, the adaptive low-pass filter 300 becomes an all-pass filter to pass all the input video data. On the other hand, when the post-processing parameter α is "1", the blocking artifact is severe at the block boundary portion of the corresponding frame. In this case, the adaptive low-pass filter 300 becomes a low-pass filter and filters the block boundary portion of the input video data, thereby removing the blocking artifact component which exists in the block boundary portion. Thus, when the post-processing parameter α is greater than "0" but less than "1" the adaptive low-pass filter 300 has an intermediate characteristic between the all-pass filter and the low-pass filter, and its filtering band is varied according to the degree of the blocking artifact of the block boundary portion.

Figure 1A:
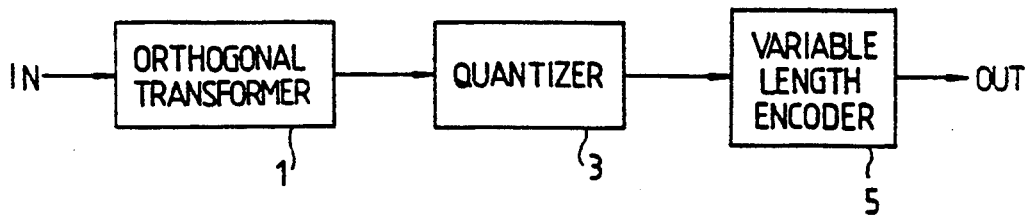
FIG. 1A is a block diagram of a conventional encoder.
Figure 1B:
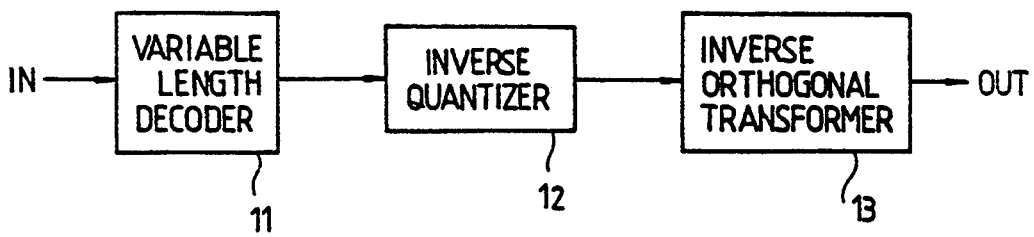
FIG. 1B is a block diagram of a conventional decoder.
Figure 2A:
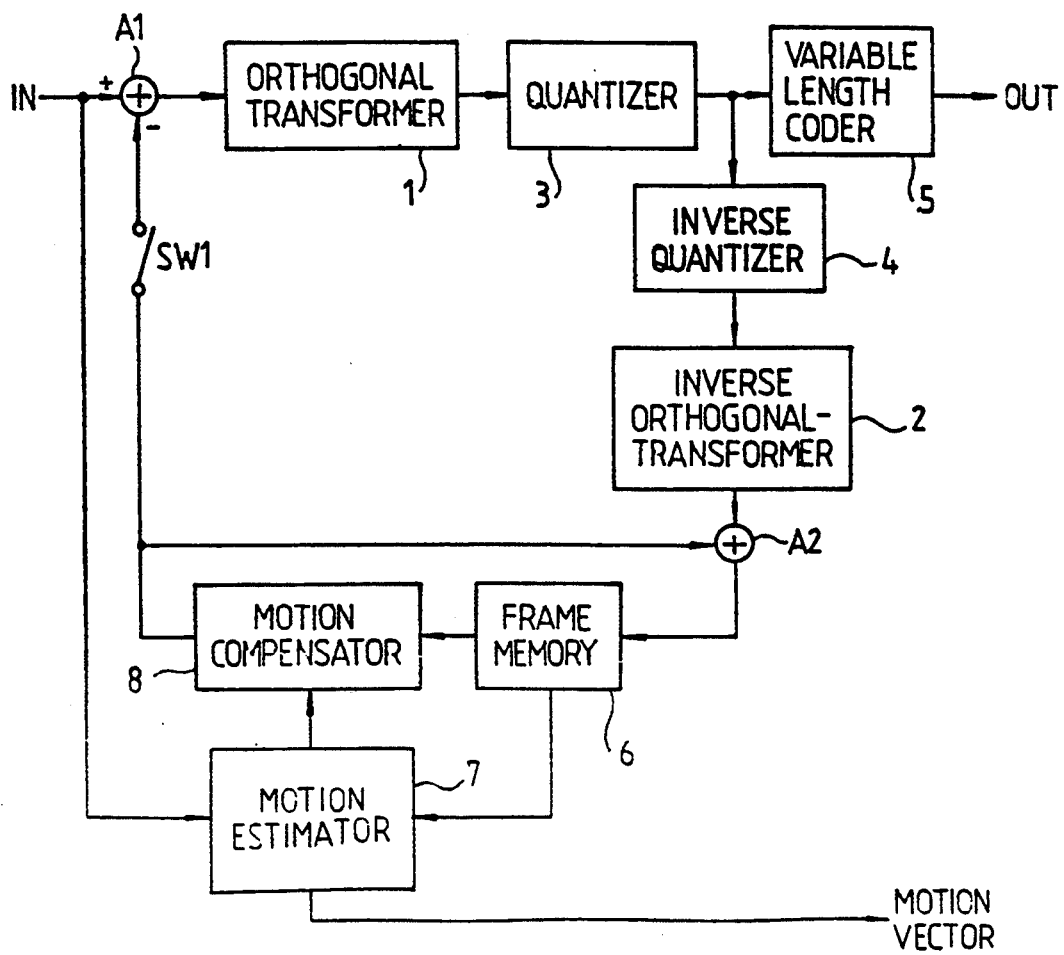
FIG. 2A is a block diagram of another conventional encoder.
Figure 2B:
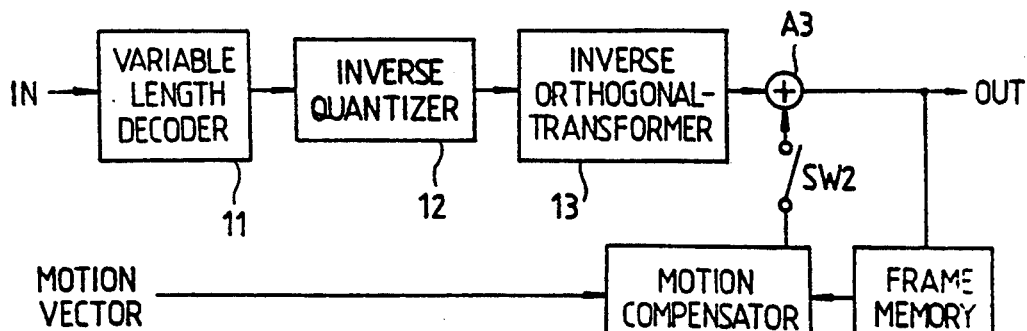
FIG. 2B is a block diagram of another conventional decoder.
Figure 4A:
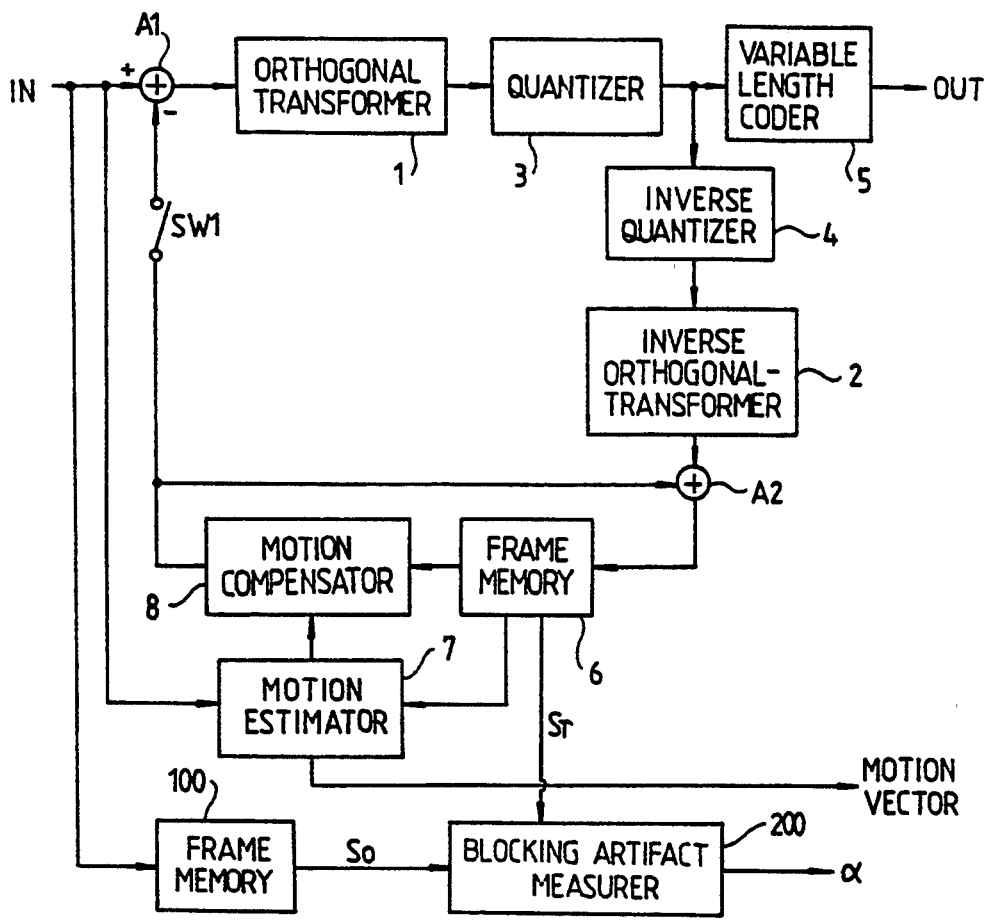
FIG. 4A is a block diagram of an encoder according to another embodiment of the present invention.
Figure 4B:
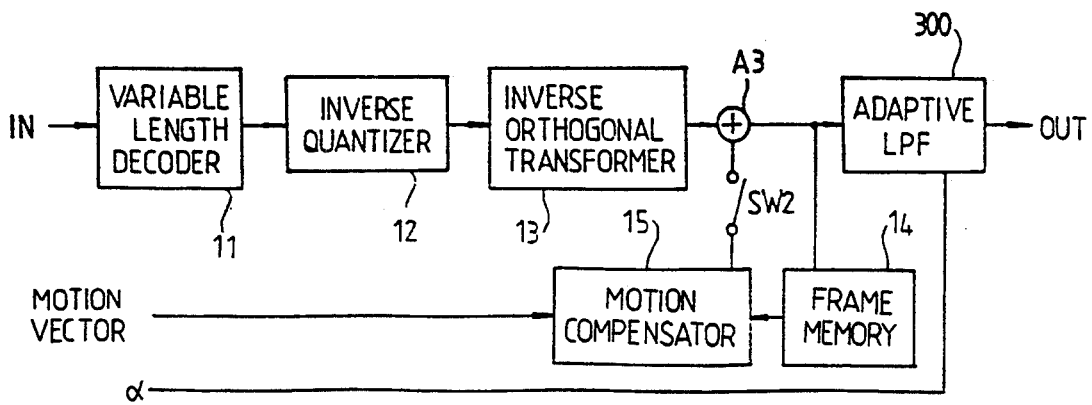
FIG. 4B is a block diagram of a decoder according to another embodiment of the present invention.

FIGS. 4A and 4B respectively illustrate an encoder and a decoder according to another embodiment of the present invention. Referring first to FIG. 4A, the blocking artifact measurer 200 is employed with an encoder similar to that as shown in FIGS. 2 which includes a predetermined feedback loop for performing DPCM. In FIG. 4A, the same components as those shown in FIG.

3A are designated with the same reference symbols. Their detailed descriptions will thus be omitted.

The feedback loop for effecting DPCM includes a frame memory 6, motion estimator 7, and motion compensator 8. The motion estimator 7 receives the N×N block data from the input terminal IN, and estimates the amount of motion between the input block data and the block data having the most similar pattern to the input block data among the frame data stored in the frame memory 6 so as to generate a motion vector MV. The motion compensator 8 extracts the corresponding block from the frame data stored in the frame memory 6 according to the motion vector supplied from the motion estimator 7, and supplies the extracted block data to the first adder A1 and the second adder A2. The first adder calculates the difference between the block data applied via the input terminal IN and the block data supplied from the motion compensator 8. The error data is encoded and transmitted. In addition, the second adder A2 adds the block data supplied from the motion compensator 8 to the restored error data supplied from the inverse orthogonal transformer 2, so as to supply the result to frame memory 6.

The blocking artifact measurer 200, as shown in FIG. 4A, is identical in construction and operation to that which is shown in FIG. 5.

Referring now to FIG. 4B, the decoder decodes the signal encoded by the encoder of FIG. 4A.

When the received transmission data is DPCM type of data, the feedback loop for restoring the DPCM data includes a frame memory 14 and a motion compensator 15. The motion compensator 15 receives the motion vector MV transmitted from the encoder, and extracts the corresponding block data from among the frame data stored in the frame memory 14 to supply the extracted data to a third adder A3. The third adder A3 adds the output data of the inverse orthogonal transformer 13 to the output data of the motion compensator 15. Then, the adaptive low-pass filter 300 receives the post-processing parameter α which is output and transmitted from the blocking artifact measurer 200 of the encoder, and adaptively filters the video data supplied from the third adder A3 according to the parameter a, thereby reducing the blocking artifact of the block boundary portion. The operational characteristics of the adaptive low-pass filter 300 are the same as that described above. Accordingly, the adaptive low-pass filter 300 functions as an all-pass filter when the post-processing parameter α is "0" while it functions as a low-pass filter when the parameter α is "1". When the parameter α is between "0" and "1" the filtering characteristic is varied according to the magnitude of the parameter a.

In the aforementioned embodiment, the degree of discontinuity of the block boundary is calculated using the frame data error corresponding to the difference between the delayed original frame data Fo and the restored frame data Fr. However, in the actual application, since the degree of discontinuity of the block boundary portion of the delayed original frame is very small, the discontinuity degree of the block boundary can be directly calculated using only the restored frame data without using the frame data error, and still sufficiently reduce the blocking artifact. In this case, the composition of the system becomes somewhat simplified.

In addition, to calculate the discontinuity degree of the block boundary, the left, right, up, and down discontinuity degrees between the blocks are measured and the measured values are added. However, to obtain the upward and downward discontinuity degree of the block boundary, since a number of delay devices are needed, the composition becomes complicated in hardware. Thus, assuming that the upward and downward and the left and right blocking artifact degrees are nearly similar to each other, even if only the left and right discontinuity degree of the block boundary is measured, the system can still sufficiently reduce the effect of the blocking artifact.

Rather than measure the discontinuity degree of all the block boundaries, the degree of discontinuity with respect to several samples taken from the picture can also be measured.

There has thus been shown and described a novel apparatus and method for encoding/decoding data including the suppression of blocking artifacts which fulfills all the objects and advantages sought therefor. Many changes, modifications, variations and other uses and applications of the subject invention will, however, become apparent to those skilled in the art after considering the specification and the accompanying drawings which disclose preferred embodiments thereof. For example, although the aforementioned embodiments include a variable-length-encoder and a variable-length-decoder, since the encoding and decoding process does not lose the data during data processing differently from a quantizing process, the present invention can also be applied to a system which does not utilize a variable-length-encoder and a variable-length-decoder. Also, even if the data which is processed in the encoding system is not two-dimensional data as described herein, but one-dimensional or more than two-dimensional, the present invention can be applied in the encoding and decoding system which utilizes block conversion. Accordingly, all such changes, modifications, variations and other uses and applications which do not depart from the spirit and scope of the invention are deemed to be covered by the invention which is limited only by the claims which follow.

What is claimed is:

1. A method for suppressing blocking artifacts in an encoder comprising the steps of: dividing original frame data into a size of predetermined blocks; compressing the data through a data transformation and a quantization process on a per unit block basis; decompressing and restoring the compressed data on a per unit frame basis; delaying the original frame data for a predetermined period of time; measuring a degree of blocking artifact by comparing the restored frame data with the delayed original frame data; and generating a post-processing parameter which represents the degree of blocking artifact.

2. The method as defined in claim 1, wherein said blocking artifact measuring step comprises the step of storing the original frame data on a per unit frame basis.

3. The method as defined in claim 1, wherein said blocking artifact measuring step comprises the steps of: calculating a frame data error corresponding to a difference between the delayed original frame data and the restored frame data; calculating a discontinuity degree of a block boundary portion in said frame data error; and generating a predetermined parameter selected according to the calculated discontinuity degree among a plurality of predetermined parameters as a post-processing parameter.

4. The method as defined in claim 3, wherein said discontinuity degree calculation step comprises the steps of: delaying said frame data error by a predetermined period of time; calculating a difference between the delayed frame data error and the frame data error; selecting the calculated difference that corresponds to the block boundary; and calculating an average value of the selected data.

5. The method as defined in claim 3, wherein said post-processing parameter is a variable between "0" and "1" according to the calculated discontinuity degree.

6. The method according to claim 4, wherein said average value calculation step comprises the step of resetting the average value to a predetermined initial value on a predetermined periodic basis.

7. A method for suppressing blocking artifacts in a decoder which receives an encoded transmission signal including encoded data and a post-processing parameter from an encoder, said post-processing parameter representing the degree of blocking artifact of said encoded data, said method comprising the steps of: receiving the encoded data and the post-processing parameter; decoding and restoring the received data; and adaptively filtering the decoded and restored data according to the post-process parameter.

8. The method as defined in claim 7, wherein said filtering step comprises the step of setting one or more characteristics of a low-pass filter according to variations in the magnitude of the post-processing parameter.

9. The method as defined in claim 7, wherein said filtering step comprises the step of setting one or more characteristics of an all-pass filtering according to variations in the magnitude of the post-processing parameter.

10. The method as defined in claim 7, wherein said filtering step comprises the step of variably filtering the decoded restored signal so that the blocking artifact generated at the block boundary portion is reduced.

11. An encoding apparatus comprising:
an input terminal for receiving original frame data;
dividing means, coupled to said input terminal, for dividing said original frame data into blocks of a predetermined size;
processing means, responsive to said blocks of data, including means for compressing the data through a data transformation process and for quantizing the data through a quantization process on a per block unit basis;
delaying means, coupled to said input terminal, for delaying the original frame data;
restoring means, coupled to said processing means, for restoring the compressed and quantized data and outputting the restored frame data; and
a blocking artifact measurer, coupled to an output of said delaying means for receiving the delayed original frame data and to an output of said restoring means for receiving the restored frame data, for measuring a degree of blocking artifact based on said delayed and restored frame data so as to generate a predetermined post-processing parameter.

12. The encoding apparatus as defined in claim 11, wherein said delay means comprises a frame memory for storing the original frame data.

13. The encoding apparatus as defined in claim 11, wherein said blocking artifact measurer comprises:
a first adder for calculating a frame data error corresponding to a difference between the delayed frame data and the restored frame data;
discontinuity degree calculating means for receiving the frame data error output from said first adder and calculating a discontinuity degree parameter at the block boundary portion; and
post-processing means, responsive to said discontinuity degree parameter, for generating a predetermined post-processing parameter which is varied according to the discontinuity degree parameter.

14. The encoding apparatus as defined in claim 13, wherein said discontinuity degree calculation means comprises:
a delay circuit for delaying the output data of said first adder by a predetermined period of time;
a second adder for calculating a difference between an output data of said first adder and an output data of said delay circuit;
a block boundary detection means for detecting data corresponding to the block boundary portion from among the output data of said second adder; and
an average error calculation means for calculating an average value of the data which is detected by said block boundary detection means.

15. The encoding apparatus as defined in claim 13, wherein said post-processing means comprises means for generating a variable post-processing parameter between "0" and "1" according to said discontinuity degree parameter output by said discontinuity degree calculation means.

16. The encoding apparatus as defined in claim 13, wherein said post-processing means comprises a read-only-memory (ROM) which stores a predetermined look-up table of post-processing parameters, and for outputting one of said post-processing parameters corresponding to said discontinuity degree.

17. The encoding apparatus according to claim 15, wherein said post-processing means comprises a read-only-memory (ROM) which stores a predetermined look-up table of post-processing parameters, and for outputting one of said post-processing parameters corresponding to said discontinuity degree.

18. The encoding apparatus as defined in claim 14, wherein said block boundary detection means comprises:
a counter for counting an interval corresponding to a block boundary, and for outputting a corresponding control signal; and
a switch, responsive to said control signal, having an input terminal connected to an output of said second adder, and an output coupled to an input of said average error calculation means, said switch being opened and closed in accordance with said control signal so as to selectively transfer data from said second adder to said average error calculation means.

19. The encoding apparatus as defined in claim 11, wherein said average error calculation means comprises means for resetting its output to a predetermined initial value on a periodic basis.

20. A decoding apparatus for suppressing blocking artifacts which receives an encoded transmission signal including encoded data and a post-processing signal from an encoder, said post-processing parameter representing the degree of blocking artifact of said encoded data, said decoding apparatus comprising:
means for receiving the encoded data and the post-processing parameter;
restoring means for decoding and restoring the received encoded data; and means for adaptively filtering the restored data output from said restoring means according to said post-processing parameter.

21. The decoding apparatus as defined in claim 20, wherein said filtering means comprises means for filtering the signal corresponding to a block boundary portion of the restored data supplied from said restoring means.

22. The decoding apparatus as defined in claim 20, wherein said filtering means comprises filtering characteristics of an all-pass filter, a low-pass filter, and a filter having functions of both said all-pass and low-pass filters, said filter characteristics varying in accordance with said post-processing parameter.

* * * * *